(12) United States Patent
Fischer et al.

(10) Patent No.: US 8,554,252 B2
(45) Date of Patent: Oct. 8, 2013

(54) METHOD FOR TRANSMITTING SHORT MESSAGES

(75) Inventors: Ralf Fischer, Bad Salzdetfurth (DE); Martin Hans, Hildesheim (DE); Frank Kowalewski, Salzgitter (DE); Holger Shulz, Berlin (DE); Gunnar Schmidt, Wolfenbuettel (DE)

(73) Assignee: Ipcom GmbH & Co. KG, Pullach (DE)

( * ) Notice: Subject to any disclaimer, the term of this patent is extended or adjusted under 35 U.S.C. 154(b) by 150 days.

(21) Appl. No.: 12/836,052

(22) Filed: Jul. 14, 2010

(65) Prior Publication Data
US 2010/0279723 A1 Nov. 4, 2010

Related U.S. Application Data (63) Continuation of application No. 09/857,675, filed as application No. PCT/DE99/01733 on Jun. 14, 1999.

(30) Foreign Application Priority Data

Dec. 8, 1998 (DE) .................................. 198 56 441

(51) Int. Cl.
*H04W 4/00* (2009.01)

(52) U.S. Cl.
USPC ..................... 455/466; 455/412.2; 455/414.2; 370/349; 370/471

(58) Field of Classification Search
USPC ................ 455/466, 412.2, 414.2, 412.1, 566; 370/349, 370, 471, 473
See application file for complete search history.

(56) References Cited

U.S. PATENT DOCUMENTS

| 4,774,706 A | | 9/1988 | Adams |
| 4,864,532 A | | 9/1989 | Reeve et al. |
| 5,212,176 A | | 5/1993 | Kyncl et al. |
| 5,379,292 A | | 1/1995 | Kurata et al. |
| 5,412,719 A | | 5/1995 | Hamamoto et al. |
| 5,604,921 A | * | 2/1997 | Alanara .......................... 455/45 |
| 5,630,060 A | | 5/1997 | Tang et al. |
| 5,652,783 A | | 7/1997 | Keba et al. |

(Continued)

FOREIGN PATENT DOCUMENTS

| DE | 19721127 A1 | 12/1997 |
| DE | 19856440 C2 | 6/2000 |

(Continued)

OTHER PUBLICATIONS

3G TS 23.040 V3.3.0, "3rd Generation Partnership Project; Technical Specification Group Terminals; Technical realization of the short Message Service (SMS)," 3GPP (1999).

(Continued)

*Primary Examiner* — Marcos Torres
(74) *Attorney, Agent, or Firm* — Nelson Mullins Riley & Scarborough LLP (57) ABSTRACT

A method for transmitting short messages (5) in a telecommunications network (10) is proposed, which enables especially simple, convenient downloading of data fields (15, 20, 25, 30) of the short message (5) from a network operator (70). A notice is sent to a subscriber (60) of the telecommunications network (10) as a function of a short message (5) transmitted to the telecommunications network (10) for the subscriber (60). With the notice, data that include items of information about the makeup and/or content of the short message (5) are transmitted to the subscriber (60).

18 Claims, 2 Drawing Sheets

(56) References Cited

U.S. PATENT DOCUMENTS

| | | | | |
|---|---|---|---|---|
| 5,734,645 | A | * 3/1998 | Raith et al. | 370/329 |
| 5,793,756 | A | 8/1998 | Ayerst et al. | |
| 5,794,142 | A | * 8/1998 | Vanttila et al. | 455/419 |
| 5,802,314 | A | 9/1998 | Tullis et al. | |
| 5,870,549 | A | 2/1999 | Bobo, II | |
| 5,896,376 | A | 4/1999 | Alperovich et al. | |
| 6,023,620 | A | * 2/2000 | Hansson | 455/419 |
| 6,085,072 | A | 7/2000 | Komiya | |
| 6,094,587 | A | 7/2000 | Armanto et al. | |
| 6,188,909 | B1 | 2/2001 | Alanara et al. | |
| 6,205,330 | B1 | * 3/2001 | Winbladh | 455/426.1 |
| 6,216,014 | B1 | * 4/2001 | Proust et al. | 455/558 |
| 6,292,668 | B1 | 9/2001 | Alanara et al. | |
| 6,301,484 | B1 | 10/2001 | Rogers et al. | |
| 6,400,942 | B1 | 6/2002 | Hansson et al. | |
| 6,400,958 | B1 | 6/2002 | Isomursu et al. | |
| 6,405,030 | B1 | 6/2002 | Suprunov | |
| 6,421,527 | B1 | 7/2002 | DeMartin et al. | |
| 6,529,717 | B1 | 3/2003 | Blants et al. | |
| 6,543,686 | B1 | 4/2003 | Ritter | |
| 6,665,531 | B1 | * 12/2003 | Soderbacka et al. | 455/412.1 |
| 6,781,972 | B1 | 8/2004 | Anderlind et al. | |
| 6,977,921 | B1 | 12/2005 | Dolan | |
| 6,987,680 | B2 | 1/2006 | Vire et al. | |
| 6,987,980 | B1 | 1/2006 | Hans et al. | |
| 7,586,870 | B2 | 9/2009 | Hans et al. | |
| 2006/0135186 | A1 | 6/2006 | Hans et al. | |
| 2009/0291698 | A1 | 11/2009 | Hans et al. | |

FOREIGN PATENT DOCUMENTS

| | | |
|---|---|---|
| EP | 0458563 A2 | 11/1991 |
| EP | 0689368 A1 | 12/1995 |
| EP | 0777394 A1 | 6/1997 |
| EP | 1138162 B1 | 10/2001 |
| EP | 1138163 B1 | 10/2001 |
| JP | 63-178634 | 7/1988 |
| JP | 10-65655 | 3/1998 |
| JP | 10-126523 | 5/1998 |
| JP | 10-215321 | 8/1998 |
| JP | 10-276414 | 10/1998 |
| JP | 10-326235 | 12/1998 |
| WO | 95/12933 A1 | 5/1995 |
| WO | WO-97/08906 A1 | 3/1997 |
| WO | WO-97/16890 A2 | 5/1997 |
| WO | WO-97/16919 A2 | 5/1997 |
| WO | WO-97/26765 A1 | 7/1997 |
| WO | WO 97/32439 A2 | 9/1997 |
| WO | WO 97/50037 A1 | 12/1997 |
| WO | WO-98/02005 A1 | 1/1998 |
| WO | WO 98/03005 A1 | 1/1998 |
| WO | WO 98/09463 A2 | 3/1998 |
| WO | WO-98/32089 A2 | 7/1998 |
| WO | WO-98/34422 A2 | 8/1998 |
| WO | WO-00/35214 A1 | 6/2000 |
| WO | WO-00/35213 A1 | 7/2000 |
| WO | WO-01/45320 A2 | 7/2001 |

OTHER PUBLICATIONS

3GPP TS 03.40 V7.5.0, "3rd Generation Partnership Project; Technical Specification Group Terminals; Technical realization of the Short Message Service (SMS)," GSM: Global Systems for Mobile Communications (2001).
3GPP TS 22.140 V5.4.0, "3rd Generation Partnership Project; Technical Specification Group Services and System Aspects; Multimedia Messaging Service (MMS); Stage 1 (Release 5)," 3GPP (2002).
3GPP TS 22.140 V8.0.0, "3rd Generation Partnership Project; Technical Specification Group Services and System Aspects; Multimedia Messaging Service (MMS); Stage 1 (Release 8)," Lte, (2008).
3GPP TS 23.140 V5.11.0, "3rd Generation Partnership Project; Technical Specificaion Group Terminals; Multimedia Messaging Service (MMS); Functional description; Stage 2 (Release 5)," GSM: Global System for Mobile Communications, (2004).
3GPP TS 23.140 V6.16.0, "3rd Generation Partnership Project; Technical Specification Group Core Network and Terminals; Multimedia Messaging Service (MMS); Functional description; Stage 2 (Release 6)," GSM: Global System for Mobile Communications, (2009).
3GPP TS 24.011 V8.2.0, "3rd Generation Partnership Project; Technical Specification Group Core Network and Terminals; Point-to-Point (PP) Short Message Service (SMS) support on mobile radio interface (Release 8)," Lte, (2009).
3GPP TS 26.140 V5.2.0, "3rd Generation Partnership Project; Technical Specification Group Services and System Aspects; Multimedia Messaging Service (MMS); Media formats and codecs (Release 5)," GSM: Global System for Mobile Communications, (2002).
Betanov, Cemil, "Introduction to X.400," Artech House, Inc., Boston, pp. 9-11, 16-25, 120-121, 124-127 (1993).
Borenstein, N. et al., "MIME (Multipurpose Internet Mail Extensions) Part One: Mechanisms for Specifying and Describing the Format of Internet Message Bodies," *Network Working Group*, (1993).
Bosch, "Generalised Structure for a Multimedia Messaging Service," ETSI STC SMG1+SMG4+SMG12 Multimedia Tdoc (1998).
Collesei, S. et al., "Short Message Service Based Applications in teh GSM Network," 5th IEEE International Symposium on Personal, Indoor and Mobile Radio Communications, vol. 3:939-943 (1994).
Courau, Francois, ETSI PT SMG, The Second Minutes SMG12 Aug. (1998).
Crispin, M., "Internet Message Access Protocol—Version 4rev1," *Network Working Group* (1996).
Crocker, David H., "Standard for the Formet of ARPA Internet Text Messages," Dept. of Electrical Engineering, University of Delaware, Obsoletes: RFC #733 (NIC #41952) (1982).
Dokko, Seh-Joon et al., "Development of Multimedia E-mail System Providing an Integrated Message View," Proceedings of the High-Performance Computing on the Information Superhighway, HPC-Asia '97, pp. 494-498 (1997).
EN 300 931 V6.0.1, "Digital cellular telecommunications system (Phase 2+); Technical realization of facsimile group 3 transparent (GSM 03.45 version 6.0.1 Release 1997)," ETSI, GSM: Global System for Mobile Communications (1999).
ETSI, "ETSI IPR Policy,"ETSI Rules of Procedure, Annex 6 (2000).
ETSI Directives, "Annex 6: ETSI Intellectual Property Rights Policy," pp. 38-42 (1997).
ETSI, "Special Mobile Group, Draft Report #1.1," ETSI/STC SMG1, SMG4, SMG12 Joint MultiMedia Adhoc, pp. 3/9-10/9 (1998).
ETSI, "Statement of Jarkko Sevanto," ETSI meeting in Hanover, Germany (1998).
ETSI, "Release Note, Recommendation GSM 3.04, Technical Realization of Short Message Service—Point to Point," (1990).
ETSI, "Release Note, Recommendation GSM 02.03, Teleservices supported by a GSM PLMN," (1992).
ETSI, "Digital cellular telecommunications system (Phase 2+); Teleservices supported by a GSM Public Land Mobile Network (PLMN); (GSM 02.03 version 5.3.2)," GSM: Global System for Mobile Communiications, ETS 300 905, Third Edition (1998).
ETSI PT12, "Technical Realization of the Short Message Service—Point-to-Point," GSM 03.40—version 3.4.0-1 (1990).
ETSI, "Digital cellular telecommunications system (Phase 2); Technical realization of the Short Message Service (SMS) Point-to-Point (PP) (GSM 03.40)," GSM: Global System for Mobile Communications, Draft prETS 300 536, Fourth Edition (1996).
ETSI/PT12, "Update Note, Recommendation GSM 03.40, Technical Realization of the SMS Point-to-Point," (1994).
ETSI, "Digital cellular telecommunications system (Phase 2+); Technical realization of facsimile group 3 transparent (GSM 03.45 version 5.2.1)," GSM: Global System for Mobile Communications, ETS 300 931, Third Edition (1998).
ETSI, "European digital cellular telecommunications system (Phase 2); Technical realization of facsimile group 3 transparent (GSM 03.45)," ETS 300 538, Second Edition (1995).
ETSI PT12, "Technical Realization of Facsimile Group 3—Non-Transparent," GSM 03.46—version 3.2.1 (1993).

(56) References Cited

OTHER PUBLICATIONS

ETSI, "Digital cellular telecommunications system; Technical realization of facsimile group 3 non-tarnsparent (GSM 03.46)," GSM: Global System for Mobile Communications, 03.46, Version 5.0.0 (1996).
ETSI, "European digital cellular communications system (Phase 2); Technical realization of facsimile group 3 non-transparent (GSM 03.46)," ETS 300 539 (1995).
ETSI, "European digital cellular telecommunications system (Phase 2); Teleservices supported by a GSM Public Land Mobile Network (PLMN) (GSM 02.03)," ETS 300 502 (1994).
ETSI TS 123 040 V4.6.0, "Digital cellular telecommunications system (Phase 2+) (GSM); Universal Mobile Telecommunications System (UMTS); Technical realization of the Short Message Service (SMS) (3GPP TS 23.040 version 4.6.0 Release 4)," GSM Global System for Mobile Communications, (2002).
Freed, N. et al., "Multipurpose Internet Mail Extensions (MIME) Part One: Format of Internet Message Bodies," *Network Working Group* (1996).
Freed, N. et al., "Multipurpose Internet Mail Extensions (MIME) Part Two: Media Types," *Network Working Group*, (1996).
Global System for Mobile Communications, "Digital cellular telecommunications system (Phase 2+); Technical realization of the Short Message Service (SMS); Point-to-Point (PP) (GSM 03.40 version 6.1.0 Release 1997)," ETSI, TS 100 901 V6.1.0 (1998).
Google Groups, "nokia 9000i," retrieved online at http://www.google.de/groups?q=nokia+9000i (2005).
Henning, Peter A., "Taschenbuch Multimedia," Fachbuchverlag Leipzig, pp. 5, 102-105, 212-213 (2003).
Hess, Christopher K. et al., "VistaMail: An Integrated Multimedia Mailing System," *IEEE Multimedia*, vol. 5(4):13-22 (1998).
International Telecommunication Union, "Series X: Data Networks and Open System Communication," ITU-T Recommendation X.420 (1996).
Internet Archive, "Frequently Asked Questions," retrieved online at: http://www.archive/org/legal/faq.php (2009).
Keller, Joerg, "Test," email (2003).
Koerner, Marianne, "MIME-Version: 1.0," e-mail (1998).
LG, "G7050 User Guide," Nokia 9000I Communicator (1995-1997).
MMS Conformance Document, Version 2.0.0 (2002).
Myers, J. et al., "Post Office Protocol—Version 3,"*Network Working Group*, (1996).
Nokia, "Bedienungsanleitung," Electronic user's guide (1998).
Nokia Corporation, "Decision and Translation of the Decision of the 5th Senate (Nullity Senate) of the German Federal patent Court," re: EP1138163, Case No. 5 Ni 31/09 (EU) (2009).
Nokia, "Multimedia Messaging: needs for standardisation," ETSI STC SMG1+SMG4+SMG12 MultimediaTdoc, (1998).
Nokia, "Multimedia Messaging Service (MMS)," SMG12 (1998).
Nokia, "Nokia introduces the new Nokia 9000i Communicator for GSM Markets," Press Release (1997).
Nokia Mobile Phones Ltd., "Smart Messaging Specification," Revision 1.0.0 (1997).
Nokia, "User's Manual," Nokia 9000i Communicator, 9357109 Issue 2 EN (1998).
Nokia, "Quick Guide to Remote MsMail," (1996).
Obst, Wolfgang, "Preisliste Handys," (1998).
Palme, J. et al., "RFC2110—MIME E-mail Encapsulation of Aggregate Documents, suc," retreived online at http://www.faqs.org/rfcs/rfc2110.html (1997).
Patel, Ahmed et al., "A technique for multi-network access to multimedia messages," *Computer Communications*, vol. 20:324-337 (1997).
Pine Information Center, "Attachments to Email Messages," retrieved online at: http://www.washington.edu/pine/faq/attachments.html (2002).
Pine Information Center, "Changes from Pine 4.03 to 4.04," retrieved online at: http://www.washington.edu/pine/changes/4.03-to-4.04.html (1998).
Rein, Lisa, "Handling Binary Data in XML Documents," retrieved online at: http://www.xml.com/pub/a/98/07/binary/binary.html (1998).
Tanenbaum, Andrew S., "SNMP—Simple Network Management Protocol," Prentice-Hall, Inc., Computer Networks, Third Edition, pp. 643-663 (1996).
TS 100 905 V6.0.0, "Digital cellular telecommunications system (Phase 2+); Teleservices supported by a GSM Public Land Mobile Network (PLMN) (GSM 02.03 version 6.0.0 Release 1997)," ETSI, GSM: Global System for Mobile Communications, (1999).
TS 100 539 V6.0.0, "Digital cellular telecommunications system (Phase 2+); Technical realization of facsimile group 3 non-transparent (GSM 03.46 version 6.0.0 Release 1997)," ETSI, (1999).
TS 100 942 V6.0.1, "Digital cellular telecommunications system (Phase 2+); Point-to-Point (PP) Short Message Service (SMS) support on mobile radio interface (GSM 04.11 version 6.0.1 Release 1997)." ETSI, GSM: Global System for Mobile Communications (1998).
von Röll, Freiherr, "Frachtbrief," Enzyklopädie des Eisenbahnwesens, pp. 118-121 (1914).
W3C®, "Synchronized Multimedia Integration Language (SMIL) 1.0 Specification," retrieved online at: http://www.w3.org/TR/REC-smil/ (1998).
WAP WSP, "Wireless Application Protocol, Wireless Session Protocol Specification," Version 30, pp. 84(95)-91(95) (1998).
WayBackMachine, http://www.xml.com/xml/pub/98/07/binary/binary.html (2009).
Woo, Thomas Y.C. et al., "Providing Internet Services to Mobile Phones: A case study with Email," *The Ninth IEEE International Symposium on Personal, Indoor and Mobile Radio Communications*, vol. 1:99-105 (1998).
European Office Action for Application No. 99938192.4, dated Oct. 31, 2006.
European Office Action for Application No. 99959215.7, dated May 11, 2006.
ETSI PT12, "Technical Realization of Fax Group 3—Transparent," GSM 03.45—version 3.3.0 (1993).
TS 100 900 V6.0.1, "Digital cellular telecommunications system (Phase 2+); Alphabets and language-specific information (GSM 03.38 version 6.0.1 Release 1997)," (1998).
TS 100 901 V6.1.0, "Digital cellular telecommunications system (Part 2+); Technical realization of the Short Message Service (SMS); Point-to-Point (PP) (GSM 03.40 version 6.1.0 Release 1997)," (1998).
US 7,187,937, 03/2007, Helferich (withdrawn)

\* cited by examiner

METHOD FOR TRANSMITTING SHORT MESSAGES

RELATED APPLICATIONS

This application is continuation of U.S. patent application Ser. No.: 09/857,675, filed Jun. 7, 2001 which is a 35 U.S.C. 371 national stage filing of International Application No. PCT/DE99/01733, filed Jun. 14, 1999, which claims priority to German Patent Application No. 198 56 441.4 filed on Dec. 8, 1998 in Germany. The contents of the aforementioned applications are hereby incorporated by reference.

BACKGROUND OF THE INVENTION

The invention is based on a method for transmitting short messages.

Short message services are already known that serve to send a short message to a subscriber of a telecommunications network without requiring that a telecommunications connection to the subscriber be made beforehand. This is of particular importance in mobile radio systems, since subscribers in such systems are often unreachable. Incoming short messages for the subscriber are stored in memory by a network operator of the telecommunications network and forwarded to the intended subscriber at a later time. The subscriber is informed of the arrival of a short message intended for him so that he can then download the short message from the network operator.

One example of a short message service using the GSM Standard (Global System for Mobile Communications) is the Short Message Service (SMS). In a short message, up to 160 7-bit ASCII (American Standard Code for Information Interchange) text characters can be transmitted.

Transmitting longer texts is possible with the aid of chained short messages. Since the GSM Standard provides only for text transmission for the short messages, then if binary data, such as audio data, image data or the like, are to be transmitted, they must be converted into the text format and converted back again into the binary format after being received. Access is possible only to the entire content of a short message, however. As a result, it can happen that data that the addressed subscriber does not want are also transmitted to him with the short message. He does not gain an overview of the contents of the short message until after downloading the entire short message from the network operator.

SUMMARY OF THE INVENTION

The method according to the invention for transmitting short messages has the advantage over the prior art that a notice is sent to a subscriber of the telecommunications network as a function of a short message transmitted to the telecommunications network for the subscriber, and with the notice, data that include items of information about the makeup and/or content of the short message are transmitted to the subscriber. In this way, the subscriber not only learns that a short message has arrived for him at the network operator. He furthermore receives further items of information about the short message that make it possible to decide whether the entire short message or only parts of the short message should be downloaded from the network operator. Thus the subscriber can access contents of short messages simply and conveniently.

It is especially advantageous if as the notice, a textbased first part of the short message, which includes the data having the items of information about the makeup and/or content of the short message, is transmitted to the subscriber. In this way, it is assured that the notice is readable by as many subscribers of the telecommunications network as possible, the subscribers already being designed to receive text-based short messages. This is especially true for mobile radio devices, embodied by the GSM (Global System for Mobile Communications) Standard, as subscribers in a GSM mobile radio network that is designed to receive and display text-based short messages by the SMS (Short Message Service). Thus from the text-based notice, the subscriber can ascertain whether short messages on hand in the network operator can be read by the subscriber at all, or which parts of such short messages are readable by the subscriber. The subscribers can then select for downloading only those parts of the short messages on hand for the subscribers in the network operator that are readable. This saves transmission capacity.

A further advantage is that with the items of information about the makeup and/or content of the short message, indications about the sender of the data stored in memory in the short message are transmitted to the subscriber. Thus the subscriber obtains a further criterion for deciding whether to download the short message on hand at the network operator.

It is especially advantageous that by means of a selection message transmitted to the telecommunications network, at least one part of the short message is requested by the subscriber from the telecommunications network, and that the at least one requested part of the short message is transmitted to the subscriber. Thus it is not necessary to download the entire short message from the network operator, but only the part the subscriber wants. This can be done especially simply by means of the selection message and leads to a saving of transmission capacity.

Another advantage is that a delete message is transmitted by the subscriber to the telecommunications network, and that as a function of the delete message, at least one part of the short message is deleted. In this way, the subscriber can also effect a selective deletion of parts of the short message, so that parts of the short message that the subscriber cannot read or does not want can be deleted and do not unnecessarily take up memory space in the network operator.

Another advantage is that the items of information about the makeup and/or content of the short message are read out at the subscriber from the notice received and shown on a display device. In this way, the user or subscriber himself can evaluate the makeup and/or content of the short message and select one or more parts of the short message for further processing especially conveniently.

It is also advantageous that the items of information about the makeup and/or content of the short message are processed directly in a subscriber station of the subscriber. This makes processing independently of the network operator possible, if for processing only modules of the subscriber station but not a module of the network operator, such as an identity module, in particular a SIM card (Subscriber Identity Module), are used.

However, processing, independently of the subscriber station, of the items of information about the makeup and/or content of the short message by means of an identity module, which is for instance made available by the network operator, is also advantageous. Then the notice can be evaluated independently of the type of subscriber station, and thus high compatibility and at the same time versatility of subscriber stations in terms of their functionality and processing modules can be achieved.

Another advantage is that with the notice, a first item of header information and a message are transmitted to the subscriber, the first item of header information including at least one item of information about the content of the message, and the message including the items of information about the makeup and/or content of the short message. In this way, the type of further processing of the message can be controlled in the subscriber station or by the identity module, so that the items of information about the makeup and/or content of the short message can be recognized as such and processed appropriately.

Another advantage is that with the message, a second item of header information and user data are transmitted to the subscriber, the first item of header information including an item of information about the presence of the second item of header information, and the second item of header information including at least one item of information about the type of evaluation of the notice to be performed. In this way, a differentiated control of the further processing of the message is possible.

It is also advantageous that as the short message, a message from an electronic mail service, in particular an Internet e-mail message, is transmitted to the telecommunications network. In this way, the access to messages in an electronic mail service can also be achieved especially simply and conveniently in a telecommunications network.

Another advantage is that the notice is transmitted to the subscriber in the form of an SMS (Short Message Service) message by the GSM (Global System for Mobile Communications) Standard. In this way, for all GSM terminal devices that support the SMS, the possibility is afforded, by way of the notice, of gaining at least knowledge about the makeup and/or content of the short message on hand, since all these terminals are capable of receiving and playing back SMS messages of this kind. Thus high compatibility for receiving the notice in SMS-capable subscriber stations of variable functionality is achieved.

It is also advantageous that the acknowledgement message is transmitted to the telecommunications network in the form of a short message for the sender, and a notice is sent to the sender as a function of the acknowledgement message, and with the notice, data that include items of information about the makeup and/or content of the acknowledgement message are transmitted to the sender. The short message and the associated notice of claim 1 can thus be employed in manifold ways, so that uniform message transmission in the telecommunications network can be assured.

Another advantage is that the acknowledgement message in the form of an SMS message by the GSM Standard and the notice in the form of a first item of header information and/or second item of header information are transmitted for the sender to the telecommunications network. By this means as well, readability of the acknowledgement message in all SMS-capable senders is assured.

It also advantageous that by means of a command message transmitted to the telecommunications network, at least one data field of the short message is processed by the subscriber as a function of the content of the command message. In this way, the notice, via the short message, not only makes an item of information about the short message possible but also enables its remote-controlled processing by the subscriber.

A particular advantage is that the command message is prepared automatically at the subscriber as a function of the items of information about the makeup and/or content of the short message. This enhances user or subscriber convenience considerably.

It is especially advantageous as well that the command message is prepared as a function of the power scope of a subscriber station assigned to the subscriber and/or as a function of command criteria that are specified by the subscriber. In this way, the remote-controlled processing of the short message is automatically adapted to the capabilities of the subscriber or to the needs of the user or subscriber, which is important for instance in loading one or more parts of the short message into the subscriber station and in deleting or forwarding parts of the short message that the subscriber station cannot read or does not want.

Another advantage is that the command message is transmitted to the telecommunications network in the form of a short message for a central station, in particular of an network operator, and a notice is sent to the central station as a function of the command message, and with the notice, data that include items of information about the makeup and/or content of the command message are transmitted to the central station. In this way, for sending commands in the telecommunications network as well, the form of the short message and of the associated notice in accordance with claim 1 is employed, so that in the telecommunications network, uniformity is attained for sending various types of information, such as commands, acknowledgments and purely postal mail services, with regard to the principle of an initially sent notice, by way of a short message correspondingly on hand in the telecommunications network in accordance with claim 1, and uniform principles for evaluating the short message on the basis of the initially sent notice can be made available.

It is also advantageous that the command message and the notice are prepared directly in a subscriber station of the subscriber. In this way, a network operator-independent preparation of the command message can be achieved solely by means of modules of the subscriber station, without modules of the network operator such as an identity module.

A preparation of the command message and the notice that is independent of modules of the subscriber station is conversely possible by means of an identity module that is made available for instance by the network operator. Then the command message can be prepared regardless of the type of subscriber station, and thus high compatibility and at the same time versatility of subscriber stations in terms of their functionality and processing modules can be achieved.

It is also advantageous that the command message in the form of an SMS message by the GSM Standard and the notice in the form of a first item of header information and/or second item of header information are transmitted for the central station to the telecommunications network. This assures readability of the command message in every SMS-capable central station.

A further advantage is that the items of information about the makeup and/or content of the short message are generated from indications about the makeup and/or content of at least two parts of the short message, and the indications are obtained from these parts. In this way, the first part of the short message need not be provided with items of information about the makeup and/or content of the entire short message, and thus it can be better used for transmitting the corresponding short message itself.

BRIEF DESCRIPTION OF THE DRAWINGS

Exemplary embodiments of the invention are shown in the drawing and described in further detail in the ensuing description.

DESCRIPTION OF THE PREFERRED EMBODIMENTS

Figure 1:
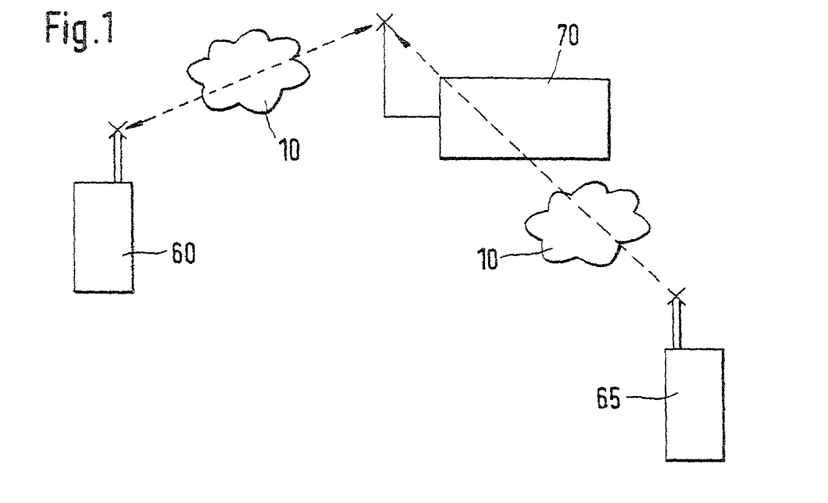
FIG. 1 shows a first block circuit diagram for transmitting short messages in a telecommunications network.

In FIG. 1, 60 designates a first subscriber and 65 a second subscriber of a telecommunications network 10, which is embodied in particular as a radiotelecommunications network, for example as a mobile radio network. The first subscriber 60 and the second subscriber 65 are each embodied as a telecommunications device, in particular as a radio unit, for example as a mobile radio device, service radio device, as a radio handset, or the like. In FIG. 1, a network operator 70 of the telecommunications network 10 is also shown; it can also be called a telecommunications device, and in particular a radio unit. The central station can also be assigned to an external service provider that is other than the network operator. However, below for the sake of example it will be assigned to the network operator 70.

In a first exemplary embodiment in accordance with FIG. 1, in the second subscriber 65, a short message 5 for the first subscriber 60 is prepared and is broadcast, suitably addressed, to the network operator 70 via the telecommunications network 10.

Figure 4:
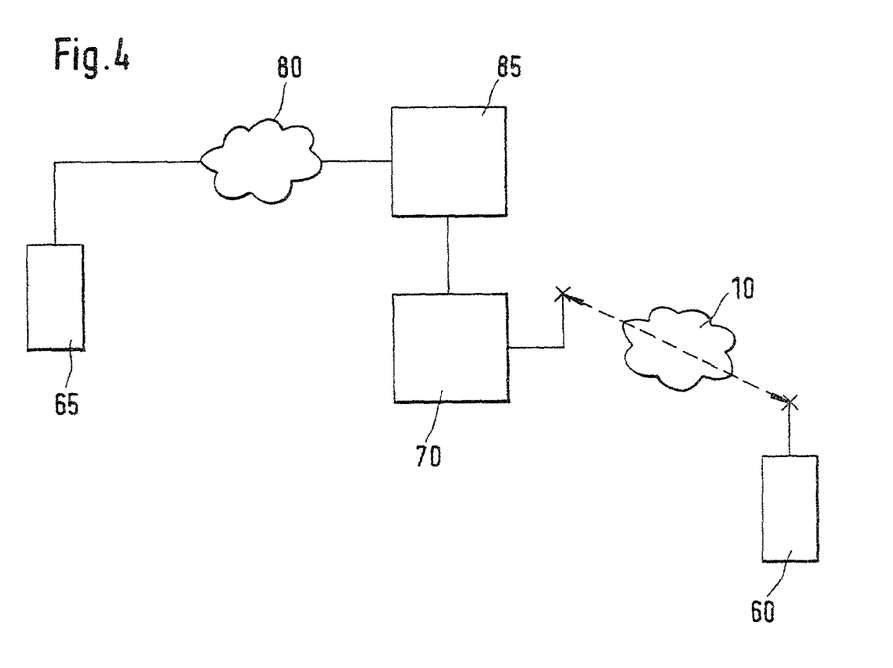
FIG. 4, a second block circuit diagram for transmitting short messages in a telecommunications network.

In a second exemplary embodiment of FIG. 4, the same reference numerals identify identical elements. Unlike the first exemplary embodiment, the second subscriber 65 communicates with the network operator not via the telecommunications network 10 but rather via a data network 80, which by way of example can take the form of the Internet, and a net connection unit 85. The short message prepared in the second subscriber 65 is sent to the network operator 70, with suitable addressing, via the data network 80 and the net connection unit 85, for instance in the form of electronic mail, such as e-mail.

In both exemplary embodiments, the network operator 70 stores the short message 5 in memory and sends a message to the first subscriber 60 informing the subscriber about the presence of a short message 5 addressed to it. This message can be sent to the first subscriber 60 for example once the network operator 70 ascertains an activation of the first subscriber 60. If after receiving the aforementioned message the first subscriber 60 asks the network operator 70 to transmit the short message 5, then the network operator 70 first sends a notice to the first subscriber 60 that informs the first subscriber 60 of the makeup and/or content of the short message 5. This mechanism is also called a polling service. Next, the first subscriber 60 can download the short message 5 either partially or entirely from the network operator 70, so that the short message 5 is transmitted partially or completely by the network operator 70 to the first subscriber 60.

However, it can also be provided that the notice is sent directly to the first subscriber 60, without a message having been sent beforehand, or as soon as an activation of the first subscriber 60 is ascertained. This mechanism is known as push service.

Figure 2:
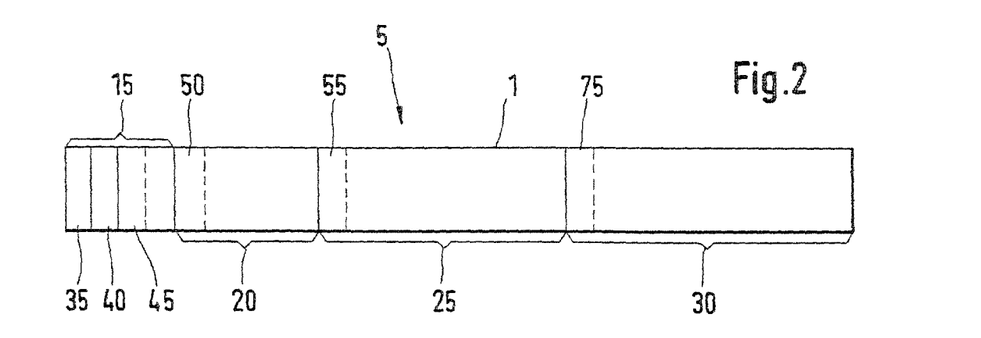
FIG. 2 shows a general makeup of a transmission frame.

In FIG. 2, the makeup of a short message 5 of this kind is shown. The short message 5 is transmitted in a transmission frame 1 from the second subscriber 65 to the network operator 70. The transmission frame 1 includes a first data field 15, a second data field 20, and optionally a third data field 25 and a fourth data field 30. The first data field 15 includes a first ID code 35, which identifies the makeup of the short message 5. In addition, a second ID code 40, which identifies the content of the short message 5, can be provided in the first data field 15. The first ID code 35 and the second ID code 40 can also be combined into a single ID code that identifies the makeup and/or content of the short message 5. Also stored in the first data field 15 are data in a first data format. In the second data field 20, data in a second data format, different from the first data format, are stored. Data whose data format can differ from the data format of the first data field 15 or the second data field 20, but need not necessarily do so, are also stored in the optionally present further data fields 25, 30.

If more than two data fields are provided in the transmission frame 1, then data in different formats are stored at least in two of the data fields, but the position of these data fields in the transmission frame 1 does not matter.

Dashed lines in FIG. 2 indicate that the first data field 15 can additionally include a first data-field-specific ID code 45, which identifies the makeup and/or content of the first data field 15. Correspondingly, the second data field 20 can include a second data-field-specific ID code 50, which identifies the makeup and/or content of the second data field 20. The third data field can correspondingly include a third data-field-specific ID code 55, which identifies the makeup and/or content of the third data field 25, and the fourth data field 30 can include a fourth data-field-specific ID code 75, which identifies the makeup and/or content of the fourth data field 30.

The first ID code 35 can include indications about the number of data fields 15, 20, 25, in the short message 5. In addition or as an alternative, the first ID code 35 can include data about the data formats of the data stored in the data fields 15, 20, 25, 30. In addition or alternatively, indications about the size of the data fields 15, 20, 25, 30 can be included in the first ID code 35. In that case, the second ID code 40 can include indications about the type of data stored in the data fields 15, 20, 25, 30. For instance, the second ID code 40 can include indications as to whether audio data or image data are stored in a data field.

It can now be provided that the network operator 70, upon the request of the first subscriber 60, will forward the first data field with the first ID code 35 and the second ID code 40 as a notice to the first subscriber 60, so that on the basis of the information, transmitted in the first ID code 35 and the second ID code 40, about the makeup and/or content of the short message 5, the first subscriber 60 can check which data fields of the short message 5 it is capable, on the basis of its functionality, of downloading and/or playing hack from the network operator 70. Also in the first subscriber 60, a decision can be made as to which of the readable data fields of the short message 5 are to be downloaded at all from the network operator 70, if not all the readable data fields of the short message 5 are of interest to the first subscriber 60, for the sake of economy of transmission capacity. If by the request of the first subscriber 60 the entire first data field 15 with the first ID code 35 and the second ID code 40 is to be transmitted to the first subscriber 60, then it should as much as possible be assured that the data stored in the first data field 15 are in a data format that is readable by all the subscribers of the telecommunications network 10. This is true particularly whenever the data stored in the first data field 15, together with the data in the first ID code 35 and in the second ID code 40, are in a text format; the SMS (Short Message Service) format by the GSM Standard (Global System for Mobile Communications), for instance, is attractive, since it is readable, in a telecommunications network embodied by the requirements of the GSM system, by the subscribers or mobile radio devices of this subscriber that are embodied by the GSM Standard. Then the first data field 15 can correspond to the data field already prescribed for the SMS by the GSM Standard and can be limited in its size to the 160 7-bit ASCII (American Standard Code for Information Interchange) text characters. It is possible to transmit relatively long notices, with the aid of chained SMS short messages. The other data fields 20, 25, 30 need not be limited in their size.

The data-field-specific ID codes 45, 50, 55, 75 can also include indications about the data formats in the respective associated data field 15, 20, 25, 30 and/or about the size of the respective associated data field 15, 20, 25, 30 and/or about the type of data in the respective data field 15, 20, 25, 30. If it is agreed that the data in the first data field 15 are in the GSM-SMS text format, and this data field is limited for instance to 160 7-bit ASCII text characters, then the first data-field-specific ID code 45 can also be omitted. It can be provided that only data in a single data format are stored in each data field 15, 20, 25, 30. However, it can also be provided that in at least one of the data fields, data in a plurality of data formats are stored, in particular in the second data field 20 and/or optionally in one or more further data fields 25, 30. Naturally, it can also be provided that the short message 5 includes more than the four data fields shown in FIG. 2.

It can also be provided that the notice from the network operator 70 to the first subscriber 60, in response to the request by the subscriber to the network operator 70, about the makeup and/or content of the short message 5 is prepared by evaluation of the data-field-specific ID codes 45, 50, 55, 75 and is then sent to the first subscriber 60, so that in this case, the first ID code 35 and the second ID code 40 are not needed, and the first data field 15 does not have to be sent to the first subscriber 60, either. Proceeding in this way is especially attractive in the second exemplary embodiment, in which the network operator 70 receives the short message 5, arriving from the data network 80 that is other than the telecommunications network 10, and this short message generally does not meet the standards of the telecommunications network 10 and thus cannot be read by all the subscribers of the telecommunications network 10. In that case, the network operator 70 generates a notice about the makeup and/or content of the incoming short message 5 that is readable by all the subscribers of the telecommunications network 10. The short message 5 received from the data network 80 can, however, also have a structure other than the transmission frame 1 described, depending on the standards on which the data network 80 is based, yet must still be recognized and evaluated by the network operator, optionally after conversion by the network connection unit 85 into a transmission frame 1 as described, so that the applicable notice can be prepared at the first subscriber 60. The notice generated in this way about the makeup and/or content of the short message 5 can thus be sent to the first subscriber 60 in a data format that is readable by all the subscribers of the telecommunications network 10; for that purpose, once again, the GSM-SMS text format, using a data field with 160 7-bit ASCII text characters, can for instance be provided in particular.

Figure 3:
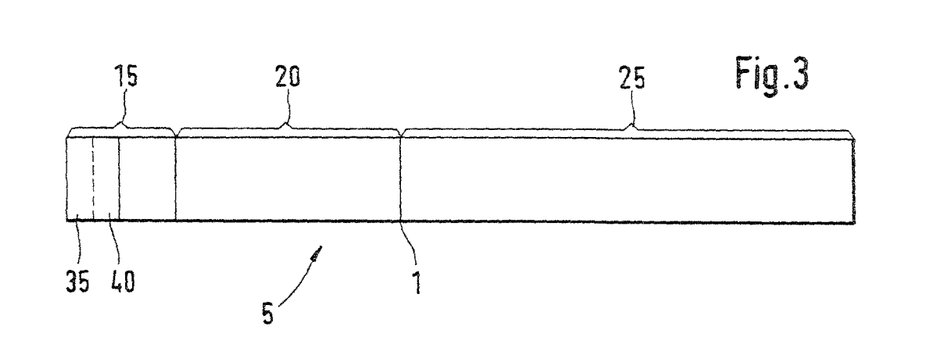
FIG. 3 shows one concrete example of a makeup of a transmission frame.

A concrete example of a transmission frame 1 for a short message 5 will now be described in conjunction with FIG. 3. The short message 5 is embodied as a multimedia short message. In FIG. 3, identical reference numerals identify the same elements as in FIG. 2. According to FIG. 3, the first data field 15, second data field 20 and third data field 25 are provided in the transmission frame 1. No data-field-specific ID codes are provided in the individual data fields 15, 20, 25. The first data field 15 includes text data in the ASCII text format; the second data field 20 includes audio data, for instance in the WAV (Wave) format; and the third data field 25 includes image data, for instance in the GIF format (Graphic Interchange Format). The first data field 15 with the text data is text-formatted in accordance with the GSM-SMS. A dashed line between the first ID code 35 and the second ID code 40 in FIG. 3 indicates that the first ID code 35 and the second ID code 40 can be combined into one common ID code. This kind of common ID code 35, 40 indicates both the number of data fields 15, 20, 25 and the content and size of the second data field 20 and third data field 25. Hence the common ID code 35, 40 can look like this:

"Multipart/2/Audio/7654/Image/12345".

This common ID code 35, 40 states that what is involved is a short message from a plurality of data fields, as indicated by the code word "Multipart". The numeral "2" indicates that besides the first data field 15, which is always present, having the text data and a length of 160 7-bit ASCII text characters, there are also two further data fields 20, 25 in the transmission frame 1 of the short message 5. "Audio" is named as the first data type in the common ID code 35, 40; thus the common ID code 35, 40 tells that the data stored in the second data field 20 are audio data. The second data type is named "Image" in the common ID code 35, 40; thus the common ID code 35, 40 tells that the data stored in the third data field 25 are image data. Following the data type in the common ID code 35, 40 is the size of the associated data field 20, 25 in each case, so that the common ID code 35, 40 tells both the length of an audio file having the audio data, transmitted in the second data field 20, which is 7654 bytes, and the length of an image file with the image data, transmitted in the third data field 25, which is 12345 bytes. For the first data field 15, no indications are required in the common ID code 35, 40, since in the example described, it always includes text data, which are compatible with the GSM-SMS text format and which are limited in number to 160 7-bit ASCII text characters. Provision can additionally be made so that the common ID code 35, 40 also indicates the data format for the data in the second data field 20 and in the third data field 25. For the audio data in the second data field 20, the WAV format could then be indicated as a data format in the common ID code 35, 40. For the image data in the third data field 25, the GIF format could be indicated as the data format in the common ID code 35, 40. However, it is also possible that the indications "Audio" and "Image" of the aforementioned common ID code 35, 40 simultaneously describe the content and the format of the data stored in the corresponding data fields 20, 25 as well, on the condition then that audio data always be present in a predetermined format, such as the WAV format, and that image data also always be present in a predetermined format, such as the GIF format, in the corresponding data field of the transmission frame 1. Based on the common ID code 35, 40 transmitted to the first subscriber 60, a decision can be made by the first subscriber whether it makes sense at all, or is desirable, to download the second data field 20 and/or the third data field 25 from the network operator 70. If the first subscriber 60 lacks audio capacity, or in other words has no capability of processing or playing back audio data, then it makes no sense to download the audio data from the second data field 20 from the network operator 70. If the first subscriber 60 has no image capability, that is, image data cannot be processed or played back in the first subscriber 60, then again it makes no sense to download image data from the third data field 25 from the network operator 70.

For selecting the data fields of the transmission frame 1 of the short message 5 that are to be downloaded from the network operator 70, provision can be made for displaying the common ID code 35, 40 on a display device of the second subscriber 60. Thus the items of information about the makeup and/or content of the short message 5 can be read out from the received notice by the subscriber 60 and shown on the display device.

The display can be in the form of a simple, optionally scrollable text display on the display device, as is usual for received SMS text messages. However, it can also be provided that the items of information about the makeup and/or content of the short message 5 are first evaluated by the first subscriber 60. In the case where menu-controlled operation is possible in the first subscriber 60, a new menu item or submenu item can be generated on the basis of this evaluation and incorporated into the existing menu structure, so that the items of information about the makeup and/or content of the short message 5 can be displayed, menucontrolled, on the display device. In addition or as alternative, the evaluation of the items of information about the makeup and/or content of the short message 5 can also be done with a view to displaying this information on the display device in the form of a directory structure, which lists the contents of the data fields of the short message 5 in the form of data files in a directory. From such a directory structure, access can then be gained conveniently to individual data files of the short message, for instance by using the cursor.

The evaluation of the items of information about the makeup and/or content of the short message 5 can be done directly by an evaluation unit using suitable software programs in the subscriber station of the first subscriber 60, and thus independently of the network operator 70. The prerequisite for this is naturally that the software programs required are also installed in the subscriber station and that the evaluation unit makes the requisite hardware platform available for executing the software programs. Otherwise, except for the pure text display of the notice on the display device, for instance by the appropriate mobile radio standard, no evaluation of the items of information about the makeup and/or content of the short message 5 in the subscriber station is possible.

In addition or as alternative to the described evaluation of the items of information about the makeup and/or content of the short message 5 directly in the subscriber station, it can also be provided that network operator-dependent evaluation be done. To that end, an access authorization card, issued to the user of the subscriber station by the network operator, in the form of an identity module can be used. This card, which can for instance be embodied as a chip card, and in particular a SIM card (Subscriber Identity Module), then includes an evaluation device in which software programs for evaluating the items of information about the makeup and/or content of the short message 5 can be run, programs that are also stored in memory on the card. The access authorization card is connected to the subscriber station via a special interface, such as an SAT (SIM Application Toolkit) interface. This interface enables the network operator 70, via the access authorization card, with a suitable hardware platform and software implementation, to trip actions in the subscriber station or to transcribe data to the subscriber station. Thus depending on the contract the user has with the network operator, a suitable evaluation device and corresponding software programs, which make options on evaluating the items of information about the makeup and/or content of the short message 5 possible. The software programs can also be updated on the card, upgraded, or at least partly deleted or blocked by the network operator 70, via the telecommunications network 10. If the evaluation is performed by means of the access authorization card, then the evaluation is possible regardless of the power scope of the subscriber station itself, and naturally the display of the items of information about the makeup and/or content of the short message 5 is done, as before, on the display device of the subscriber station; appropriate data are transmitted between the subscriber station and the access authorization card via the interface described.

Provision can also be made to enable the items of information about the makeup and/or content of the short message 5 to be evaluated on a further card, independently of both the subscriber station and the network operator 70. Such a card can be made available by a suitable service provider. Reference numeral 70 in this case designates the service provider. Like the access authorization card, this further card can be inserted into its own card slot that has a card reader in the subscriber station of the first subscriber 60. However, a card reader connected externally to the subscriber station can also be provided for the card issued by the service provider.

Figure 5:
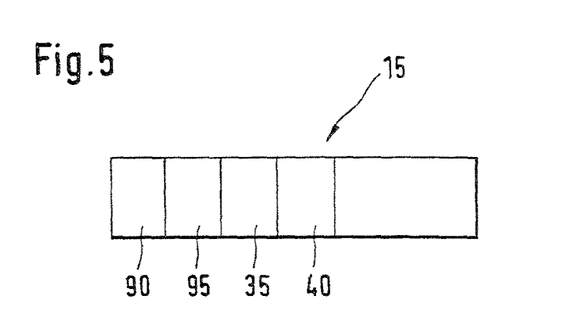
FIG. 5, the makeup of a notice having items of information about the makeup and/or content of a short message.

For evaluating the items of information about the makeup and/or content of the short message 5, these items of information must be delivered to the evaluation unit of the subscriber station and/or of the evaluation device on the access authorization card. The evaluation unit or device must then be capable of recognizing the data, transmitted with the notice, as items of information about the makeup and/or content of the short message 5 and of distinguishing them from purely text messages, for instance. To that end, the notice, which is represented in FIG. 5 as a first data field 15, includes a first item of header information 90, which includes an item of information about the further content of the notice. The first item of header information can include the item of information according to which the notice contains items of information about the makeup and/or content of the short message 5. The evaluation unit or device thus recognizes the notice as a notice about a short message 5 on hand in the network operator 70 and is then capable of selecting the software programs required for a specified evaluation of these items of information and of performing that evaluation. However, the first item of header information 90 is not necessary if the evaluation unit or device makes it possible only to evaluate items of information about the makeup and/or content of the short message 5.

It can also be provided, as shown in FIG. 5, that there be a second item of header information 95 in the notice. The first item of header information 90 then contains only an item of information about the presence of the second item of header information 95, for instance in the form of a set bit. The second item of header information 95 in that case contains items of information about the type of evaluation of the notice that is to be performed. The evaluation to be performed can comprise merely displaying the notice in text form on the display device. If the notice involves items of information about the makeup and/or content of the short message 5, then the second item of header information 95 can also specify a menu-controlled display, especially with a directory structure, of these items of information for the evaluation to be performed. Thus the second item of header information 95 is necessary especially whenever a choice must be made between a plurality of evaluation options, implemented in the evaluation unit or device, for the items of information about the makeup and/or content of the short message 5.

The first item of header information 90 and optionally the second item of header information 95 then adjoin the first ID code 35 and the second ID code 40 in the first data field 15 as shown in FIG. 5.

By the display of the items of information about the makeup and/or content of the short message 5 on the display device of the subscriber station, the user, for instance by menu control, can initiate a further processing of the short message 5, or of parts of the short message 5, such as one or more data fields of the short message 5. This can be done by user input at an input unit of the subscriber station, for instance using the cursor. The user can then input or specify command criteria by which the short message 5 is to be processed, in accordance with his needs. If there are video data in the short message, then the user can for instance specify that these data of the short message 5 be deleted in the network operator 70, either because he does not want to view them or because his subscriber station does not permit their display. In that case on the basis of the user input, a command message with a suitable processing command is then prepared and sent to the network operator 70. It is also possible according to the invention for the command message to be transmitted to the telecommunications network 10 in the form of a short message 5 for the network operator 70; a notice is sent to the network operator 70 either beforehand or together with the command message. The notice can have the makeup described and can include items of information about the makeup and/or content of the command message. To that end, as described, it can be provided with a first item of header information 90 and optionally a second item of header information 95, in order to bring about the presence of a command message by means of the first item of header information 90 and optionally to bring about evaluation and processing, as desired by the first subscriber 60, of the command message by means of the second item of header information 95 on the part of the network operator 70, if a choice can be made between a plurality of different types of evaluation and/or processing. If only the first item of header information 90 indicating the presence of a command message is present, then that item of header information is evaluated and processed by the network operator 70 in a way specified in the network operator 70.

The command message can be in the form of an SMS message by the GSM Standard, and then the notice can be limited to the first item of header information 90 and optionally the second item of header information 95. If only the first item of header information 90 is provided in the notice, then the network operator 70 can for instance merely specify that the command message be displayed on a display device of the central station of the network operator 70, this display serving as evaluation or processing of the command message. Processing of the short message, present in the network operator 70 for the first subscriber 60, can then be brought about by an operator on the basis of the command message.

If the second item of header information 95 is present in the notice for the command message, then processing desired by the first subscriber 60 of the short message present for the first subscriber 60 in the network operator 70 can also already be specified, so that this processing is automatically initiated in the network operator 70.

However, the command message can additionally or alternatively to manual user input also be prepared automatically in the first subscriber 60 on the basis of the evaluated items of information about the makeup and/or content of the short message 5. Then both in the automatic and the manual preparation of the command message, provision can be made so that only those commands for processing the short message 5 that are in accordance with the power scope of the first subscriber 60, or the corresponding subscriber station, can in fact be generated. If the first subscriber 60 lacks video capability, for instance, then no command message can be generated for downloading video data in the short message 5 to the first subscriber 60. On the contrary, a command can even be automatically incorporated into the command message that the applicable video data in the short message 5 should be deleted at the network operator 70. The command message can also be automatically prepared in accordance with command criteria specified by the user and/or the network operator 70. To that end, at the first subscriber 60, in the evaluation unit of the associated subscriber station and/or in the evaluation device of the access authorization card, a so-called profile that contains the applicable command criteria is put in memory. The command criteria can be specified for various items of information about the makeup and/or content of the short message 5, and as a function of these items of information about the makeup and/or content of the short message 5, applicable command criteria can be generated, so that for instance in the case of items of information about video data present in the short message 5, a command criteria is provided which generates a command message to delete these video data from the short message 5. The profile can also be stored at least in part at the network operator 70 itself. If the network operator 70 detects video data in a short message 5 on hand for the first subscriber 60, then if a command criteria is correspondingly present, the network operator can itself perform the deletion immediately, without informing the first subscriber 60 about these video data. A specification about using the push service or the polling service can also be included in the profile at the network operator 70. If a plurality of data types is present in the short message 5 on hand at the network operator 70 for the first subscriber 60, it can for instance be provided that the push service and the polling service each be used for different types of data, such as the push service for video data and the polling service for audio data.

In accordance with the evaluation of the items of information about the makeup and/or content of the short message 5, the command message can also be prepared independently of the network operator, by means of the evaluation unit of the first subscriber 60, and/or dependent on the network operator by means of the evaluation device on the access authorization card. However, it can also be provided that the command message is prepared independently of the network operator and independently of the subscriber station of the first subscriber 60, by means of a suitable evaluation device on the card of a service provider, if the evaluation of the items of information about the makeup and/or content of the short message 5 is already done in this way as well.

The short message 5 could also include a transmission frame 1 comprising precisely two data fields 15, 20; in the first data field 15, the text data with the common ID code 35, 40 are then present, as described, while in the second data field 20, a plurality of data types or media are combined. However, it can also be provided that N data types or media, to be transmitted in the short message 5, are distributed to N or N+1 data fields in the transmission frame 1 of the short message 5. In that case, the first subscriber 60 can download all the data fields of the short message 5 from the network operator 70 either individually or all together.

In the first subscriber 60, an evaluation of the transmitted common ID code 35, 40 can also already be performed, so that their display on the display device of the first subscriber 60 already indicates which data fields of the short message 5 can be downloaded at all from the network operator 70, based on the functionality of the first subscriber 60.

The second subscriber 65 generates a short message 5 in the described transmission frame 1. The generation of a transmission frame 1 in the second subscriber 65 can be done simply by linking together the individual data fields 15, 20, 25, 30, optionally adding to each of them a respective one of the data-field-specific ID codes 45, 50, 55, 75. The network operator 70 in turn receives and stores short messages 5 in memory in the transmission frame 1 described. If the first subscriber 60 has the appropriate functionality, provision can be made for the transmission frame 1 to downloaded in its entirety from the network operator 70 and transmitted to the first subscriber 60. In this case, the first subscriber 60 receives the short message 5 in the transmission frame 1 described, optionally stores it in memory, and/or plays it back in visual and/or acoustical form. The first subscriber 60 receives at least a single data field of the transmission frame 1, optionally stores it in memory, and/or plays it back visually and/or acoustically. An evaluation of received data fields 15, 20, 25, 30 in the network operator 70 and in the first subscriber 60 can for instance be done on the basis of the data-field-specific ID codes 45, 50, 55, 75 if these have been transmitted with the associated data fields 15, 20, 25, 30, or on the basis of the first ID code 35 and/or second ID code 40 if they have been transmitted.

The transmission frame 1 of the invention is not limited to use in a radiotelecommunications network but can also be used in a landline telecommunications network 10, in which case the subscribers 60, 65 and the network operator 70 are also connected by landline. Provision can also be made for one of the two subscribers 60, 65 to be in communication via a landline telecommunications network 10, and for the other of the two subscribers 60, 65 to be in communication via a wireless telecommunications network 10, with the network operator 70, so that the transmission frame 1 is suitable for transmitting short messages 5 both in the landline telecommunications network and the wireless telecommunications network 10.

After the short message 5 arrives at the network operator 70 of the telecommunications network 10, the network operator 70 checks whether signalling items of information, which identify an activation of the first subscriber 60 are being received from the first subscriber 60. The network operator 70 thereupon sends a message to the first subscriber 60 that informs the first subscriber 60 of the presence of a short message 5 sent to the subscriber and stored in memory at the network operator 70. A decision can thereupon be made at the first subscriber 60 whether indications about the makeup and/or content of the short message 5 should be requested from the network operator 70. If so, then a corresponding request signal is transmitted from the first subscriber 60 to the network operator 70 via the telecommunications network 10. The network operator 70 thereupon generates a notice that includes items of information about the makeup and/or content of the short message 5 and sends this notice to the first subscriber 60 via the telecommunications network 10. The notice can for instance include the first text-based data field 15 in the transmission frame 1 of the short message 5; this data field includes the first ID code 35 and the second ID code 40 of FIG. 2 and FIG. 3. However, it can also be provided that the first data field 15 of the short message 5 includes neither the first ID code 35 nor the second ID code 40, but only the first data-field-specific ID code 45. The network operator 70 can then prepare the notice about the makeup and/or content of the short message 5 by evaluating all the data-field-specific ID codes 45, 50, 55, 75, and can for instance generate a text-based data field for transmitting the thus-prepared notice, which data field is readable by as much as possible all the subscribers in the telecommunications network 10. This text-based data field can be in accordance with the GSM-SMS text format, with a size of up to 160 7-bit ASCII text characters. The notice generated by the network operator 70 can thus include items of information about the makeup of the short message 5, which items of information can for instance include indications about the number of data fields 15, 20, 25, 30 and/or about the data formats of the data stored in the data fields 15, 20, 25, 30, and/or about the size of the data fields 15, 20, 25, 30. The notice generated by the network operator 70 can also include items of information about the content of the short message 5, which can contain indications about the presence of different data types in the various data fields 15, 20, 25, 30 of the short message 5. In the case where the notice includes the first ID code 35 and the second ID code 40, the items of information about the makeup of the short message 5 are transmitted with the first ID code 35, and the items of information about the content of the short message 5 are transmitted with the second ID code 40, in the applicable notice from the network operator 70 to the first subscriber 60. The notice transmitted from the network operator 70 to the first subscriber 60 can include additional indications about the second subscriber 65 as the sender of the data stored in the short message 5. In this way, the first subscriber 60 is informed who the sender of the short message 5 is. Based on the notice transmitted from the network operator 70 to the first subscriber 60 via the telecommunications network 10, a decision can be made in the first subscriber 60 as to which data fields 15, 20, 25, of the short message 5 are readable at all by the first subscriber 60, and which of the readable data fields should be downloaded from the network operator 70. To that end, the first subscriber 60 sends a corresponding command message, embodied as a selection message, to the network operator 70 via the telecommunications network 10, in which message at least one of the data fields 15, 20, 25, 30 of the short message 5 is requested from the network operator 70 of the telecommunications network 10. The data fields of the short message 5 that are requested by the first subscriber 60 are then transmitted from the network operator 70 to the first subscriber 60 via the telecommunications network 10 and there, optionally after preprocessing, are played back on a playback device, not shown in FIG. 1. If two or more data fields are requested by the first subscriber 60 by means of the selection message, then they can be transmitted from the network operator 70 to the first subscriber 60 either simultaneously or chronologically separately.

It can also be provided that in the first subscriber 60, after reception and playback of the notice about the makeup and/or content of the short message 5, one or more data fields are selected, which are to be deleted at the network operator 70 or forwarded to a further subscriber of the telecommunications network 10 or of the data network 80, for instance because they cannot be read or played back by the first subscriber 60. To that end, in the case of a deletion request, the first subscriber 60 sends a command message embodied as a delete message to the network operator 70 via the telecommunications network 10; the data fields of the short message 5 that are to be deleted are indicated in the delete message. The network operator 70 then, in accordance with the indications in the delete message, deletes the applicable data fields of the short message 5 from a memory, not shown in FIG. 1. In the case of the forwarding request, the first subscriber 60 sends a command message, embodied as a forwarding message, to the network operator 70 via the telecommunications network 10, and the data fields of the short message 5 that are to be forwarded are indicated in the forwarding message. By suitable addressing, it is also indicated in the forwarding message to which subscriber or subscribers the data fields are to be forwarded. Then in accordance with the indications in the forwarding message, the network operator 70 forwards the applicable data fields of the short message 5 to the addressed subscriber or subscribers; different data fields of the short message 5 can be forwarded to different subscribers or to the same subscribers.

It is understood that in the first subscriber 60, it is possible by means of the selection message for all the data fields 15, 20, 25, 30 of the short message 5 to be requested for downloading at the network operator 70. It is equally possible by means of the delete message for all the data fields 15, 20, 25, 30, or in other words the entire short message 5, to be released for deletion at the network operator 70.

The request of data fields will now be described concretely taking as an example the transmission frame 1 shown in FIG. 3. In response to the message about the presence of a short message 5 sent to it, the first subscriber 60, as a request signal, sends the command "get MMK Content" (MMK stands for Multimedia Short Message) to the network operator 70. The first subscriber 60 thereupon receives a notice from the network operator that describes the makeup and/or content of the multimedia short message 5 in accordance with FIG. 3. As an example, this notice is then the same one described above, that is, "Multipart/2/Audio/7654/Image/12345". From this notice, the first subscriber 60 can now tell how many data fields 15, 20, 25 comprise the multimedia short message 5. In the example described, it is found that the multimedia short message 5 comprises three data fields 15, 20, 25. The first subscriber 60 thereupon finds that the data stored in the first data field 15 are ASCII text data, the data stored in the second data field 20 are audio data, and the data stored in the third data field 25 are image data. The notice from the network operator 70 could additionally include indications that the audio data are in the WAV format and the image data are in the GIF format, for instance, in the applicable data fields 20, 25 of the short message 5. With the selection message "Get MMK (x)", the $x^{th}$ data field 15, 20, 25 can now be requested from the network operator 70, where x=1, 2 or 3. Thus after the selection message "get MMK (2)", the audio data of the second data field 20 are sent to the first subscriber 60 by the network operator 70. A plurality of data fields can be requested from the network operator by a selection message "get MMK (x, y, . . . )".

It can also be provided that after receiving a short message 5, made up as described, from the second subscriber 65, the network operator 70 generates an acknowledgement message to acknowledge the reception of the short message 5 and sends it to the telecommunications network 10 for the second subscriber 65 as in the first exemplary embodiment of FIG. 1. The acknowledgement message can likewise take the form of a short message made up as described; a notice is sent to the sender as a function of the acknowledgement message, and with the notice, data can be transmitted to the sender that include items of information about the makeup and/or content of the acknowledgement message. As in the command message described, it can be provided that the acknowledgement message is transmitted as an SMS message by the GSM Standard and that the notice is transmitted as a first item of header information 90 and optionally as a second item of header information 95 to the telecommunications network 10 for the second subscriber 65.

If only the first item of header information 90 is provided in the notice, then at the second subscriber 65 it is possible for instance merely to provide for displaying the acknowledgement message on a display device of the subscriber station of the second subscriber 65, to serve as the evaluation or processing of the acknowledgement message.

If the second item of header information 95 is present in the notice for the acknowledgement message, then processing of the acknowledgement message desired by the network operator 70 can already be specified, so that it is automatically initiated at the second subscriber 65.

Analogously, an acknowledgement message can also be output by the network operator 70 to the telecommunications network 10 for the first subscriber 60, with which message the network operator 70 can acknowledge the reception of a command message.

Correspondingly, an acknowledgement message can also be output to the telecommunications network 10 by the first subscriber 60 for the network operator 70, with which message the first subscriber 70 can acknowledge the reception of a message.

It can also be provided that the evaluation of the items of information about the makeup and/or content of the short message 5 and/or that the preparation of command messages be done at least in part in an external unit remote from the subscriber station of the first subscriber 60, and the display device for displaying the items of information about the makeup and/or content of the short message 5 can also be provided in the external unit, in particular in the form of a monitor.

The invention claimed is:

1. A system for transmitting short messages in a radio telecommunications network, comprising:
a central station of a telecommunications network receiving a short message from a first subscriber of the telecommunications network, the short message being addressed to a second subscriber of the telecommunications network, the central station evaluating the short message from the first subscriber to identify information about a makeup and/or content of the short message, the central station formulating a notification message addressed to the second subscriber, the notification message including the information about the makeup and/or content of the short message, a first item of header information, and a second item of header information, wherein the first item of header information includes an item of information about a presence of the second item of header information, and the second item of header information includes at least one item of information about a type of evaluation of the notification message to be performed, the central station sending the notification message to the second subscriber.

2. A system as defined in claim 1, wherein the central station transmits to the second subscriber a message that includes items of information about presence of the short message transmitted to the telecommunications network.

3. A system as defined in claim 1, wherein the central station transmits to the second subscriber the notification message only after a request signal has been output by the second subscriber to the telecommunications network.

4. A system as defined in claim 1, wherein the central station transmits the notification message as a text-based data field.

5. A system as defined in claim 1, wherein the notification message includes items of information about the makeup of the short message, indications about the number of data fields of the short message and/or about data formats in the data fields, and/or about a size of the data fields.

6. A system as defined in claim 1, wherein the notification message includes items of information about the content of the short message, indications about the presence of various data types and the short message in various data fields of the short message.

7. A system as defined in claim 1 wherein the notification message includes items of information about the makeup and/or content of the short message, indications about a sender of the data stored in memory of the short message.

8. A system as defined in claim 1, wherein a station of the second subscriber comprises an identity module for recognizing the items of information about the makeup and/or content of the short message.

9. A system as defined in claim 1, wherein the first subscriber transmits to the communication network the short message as a message from an electronic mail surface as an Internet Email message.

10. A system as defined in claim 1, wherein the central station transmits the notification message to the second subscriber in form of a short message surface by global system for mobile communications standard.

11. A system as defined in claim 1, wherein the first subscriber is a mobile sending station and the central station is a network operator.

12. A system as defined in claim 1, wherein the central station transmits to the telecommunications network an acknowledgment message for the first subscriber once the short message has been received.

13. A system as defined in claim 12, wherein the acknowledgment message is transmitted to the telecommunications network in form of a short message for the first subscriber, and a notification message is transmitted to the first subscriber as a function of the acknowledgment message, with the notification message transmitted to the first subscriber data that include items of information about the makeup and/or content of the acknowledgment message.

14. A system as defined in claim 13, wherein the acknowledgment message is transmitted to the telecommunications network in form of a short message according to the short message service of the global system for mobile communication standard and the notification message in form of a first item of header information and/or second item of header information.

15. A system as defined in claim 1, wherein the central station is a network operator and a station of the second subscriber is a mobile receiver.

16. A system for transmitting short messages in a radio telecommunications network, comprising:
a station of a communications network, the station:
receiving a short message addressed to a subscriber of the telecommunications network,
evaluating the short message to identify information about a makeup and/or content of the short message,
formulating a notification message addressed to the subscriber as a function of the short message, and
sending the notification message to the subscriber, the notification message transmitted to the telecommunications network for the subscriber,
wherein the notification message includes a first data field of the short message, which includes the data having the items of information about the makeup and/or the content of the short message,
wherein the station of the communications network transmits the notification message to the subscriber with a first item of header information and a message, the first item of header information including at least one item of information about the content of the message, the message including the item of information about the makeup and/or content of the short message, wherein the station of the communications network transmits the notification message to the subscriber with a second item of header information and user data, the first item of header information including an item of information about the presence of the second item of header information, and the second item of header information including at least one item of information about the type of evaluation of the notification message to be performed.

17. A system as defined in claim 16, wherein the second item of header information and user data is transmitted as an element of the message.

18. A system as defined in claim 16, wherein the first data field of the short message is transmitted to the subscriber as the notification message.

\* \* \* \* \*

UNITED STATES PATENT AND TRADEMARK OFFICE
CERTIFICATE OF CORRECTION

| | | |
|---|---|---|
| PATENT NO. | : 8,554,252 B2 | Page 1 of 1 |
| APPLICATION NO. | : 12/836052 | |
| DATED | : October 8, 2013 | |
| INVENTOR(S) | : Ralf Fischer et al. | |

It is certified that error appears in the above-identified patent and that said Letters Patent is hereby corrected as shown below:

Title page, under (75) 4th Inventor, "Holger Shulz" should be --Holger Schulz--.

Signed and Sealed this
Thirty-first Day of March, 2015

Michelle K. Lee
*Director of the United States Patent and Trademark Office*